(12) United States Patent
Patel et al.

(10) Patent No.: US 7,303,126 B2
(45) Date of Patent: Dec. 4, 2007

(54) SYSTEM AND METHOD FOR SENSING AMBIENT LIGHT IN AN OPTICAL CODE READER

(75) Inventors: Mehul Patel, Fort Salonga, NY (US); Pierre Craen, Southampton, NY (US); William Joshua Becker, Lindenhurst, NY (US); Daniel Brown, E. Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 471 days.

(21) Appl. No.: 10/803,669

(22) Filed: Mar. 18, 2004

(65) Prior Publication Data

US 2005/0205677 A1  Sep. 22, 2005

(51) Int. Cl.
*G06K 7/14* (2006.01)
(52) U.S. Cl. .................... 235/454; 235/462.25
(58) Field of Classification Search ............. 235/454, 235/472.01, 462.35, 462.25, 462.26, 462.27, 235/462.28, 472
See application file for complete search history.

(56) References Cited

U.S. PATENT DOCUMENTS

| | | | |
|---|---|---|---|
| 4,818,856 A * | 4/1989 | Matsushima et al. .. 235/462.45 |
| 5,189,464 A * | 2/1993 | Farrington et al. ........... 396/75 |
| 5,672,858 A * | 9/1997 | Li et al. ................. 235/462.04 |
| 5,742,340 A * | 4/1998 | Alves ......................... 348/255 |
| 5,801,371 A | 9/1998 | Kahn et al. |
| 5,955,720 A | 9/1999 | He et al. |
| 6,340,114 B1 | 1/2002 | Correa et al. |
| 6,385,352 B1 * | 5/2002 | Roustaei ..................... 382/324 |
| 6,398,112 B1 * | 6/2002 | Li et al. ................. 235/462.01 |
| 6,634,558 B1 | 10/2003 | Patel et al. |
| 6,685,092 B2 | 2/2004 | Patel et al. |
| 6,695,209 B1 * | 2/2004 | La .......................... 235/462.2 |
| 6,708,883 B2 * | 3/2004 | Krichever ............. 235/462.01 |
| 6,729,546 B2 * | 5/2004 | Roustaei ................ 235/462.45 |
| 7,021,542 B2 * | 4/2006 | Patel et al. .................. 235/454 |

* cited by examiner

*Primary Examiner*—Daniel St. Cyr
(74) *Attorney, Agent, or Firm*—Carter, DeLuca, Farrell & Schmidt, LLP

(57) ABSTRACT

A system and method are provided for scanning an optical code, in which an optical code scanner system includes an ambient light sensor having at least one photo sensor for sensing ambient light conditions and generating at least one first electrical signal corresponding to the sensing of the ambient light conditions, and a photo sensor array having a plurality of photo sensors for sensing light reflected from the target being imaged and generating a plurality of second electrical signals corresponding the sensing of the reflected light. The optical code scanner system further includes at least one of exposure circuitry for controlling exposure during the sensing of the reflected light, gain circuitry for processing gain of at least a portion of the plurality of second electrical signals and an illumination assembly for providing illumination for illuminating the target; and a processing circuitry for processing at least a portion of the at least one first electrical signal and controlling at least one of the exposure circuitry, the gain circuitry and the illumination assembly in accordance with the processing of the at least a portion of the at least one first electrical signal.

35 Claims, 5 Drawing Sheets

SYSTEM AND METHOD FOR SENSING AMBIENT LIGHT IN AN OPTICAL CODE READER

BACKGROUND OF THE INVENTION

1. Field of the Invention

This invention relates to optical code readers. In particular, this invention relates to a system and method for sensing ambient light in an optical code reader.

2. Description of the Prior Art

Optical code scanner systems have been developed heretofore for reading optical codes such as bar code symbols appearing on a label or on a surface of an article. The symbol itself is a coded pattern of indicia comprised of, for example, a series of bars of various widths spaced apart from one another to bound spaces of various widths, where the bars and spaces having different light reflecting characteristics. The scanners in scanning systems electro-optically transform the graphic indicia into electrical signals, which are decoded into alphanumeric characters that are intended to be descriptive of the article or some characteristic thereof. Such characters are typically represented in digital form and utilized as an input to a data processing system for applications in point-of-sale processing, inventory control and the like.

Optical code scanners are used in both fixed and portable installations in many diverse environments, such as in stores for check-out services, in manufacturing locations for work flow and inventory control, and in transport vehicles for tracking package handling. The optical code can be used as a rapid, generalized means of data entry, for example, by scanning a target barcode from a printed listing of many barcodes. In some uses, the optical code scanner is connected to a portable data processing device or a data collection and transmission device. Frequently, the optical code scanner is a handheld scanner including a handheld sensor which is manually directed at a target code.

Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

One type of optical code scanner is an array optical imager scanner, which includes an image sensor having a two-dimensional array of cells or photo sensors, such as an area charge coupled device (CCD), for imaging a target, including sensing light reflected of a target being imaged and generating a plurality of electrical signals corresponding to the sensing which are then processed and provided to decode circuitry for decoding the processed electrical signals. The imager sensor includes associated circuitry for generating and processing the electrical signals, which correspond to a two-dimensional array of pixel information describing the field of view of the scanner. The image sensor is further coupled to a lens assembly for focusing light incident on the image sensor.

The quality of the information obtained from the sensing by the photo detectors is affected by ambient light conditions. Optimal information can be obtained by selecting appropriate settings in accordance with the ambient light conditions, including setting exposure (i.e., integration) time and/or adjusting gain settings for gain processing of the plurality of electrical signals. However, the process of selecting the settings is a time consuming and processing resources consuming process, including selecting arbitrary settings, imaging a target and determining if the settings need adjustment, making the adjustments and imaging the target with the adjusted settings. The time delay incurred by the adjusting and setting process until a successful decode operation is performed may be perceived by the user as a lack of aggressiveness.

Accordingly, there is a need for a system and method for selecting the settings in a manner that is efficient with regard to the time and processing resources consumed.

SUMMARY OF THE INVENTION

In accordance with the present invention, an optical code scanner system is provided for imaging a target. The optical code scanner system includes an ambient light sensor having at least one photo sensor for sensing ambient light conditions and generating at least one first electrical signal corresponding to the sensing of the ambient light conditions, and a photo sensor array having a plurality of photo sensors for sensing light reflected from the target being imaged and generating a plurality of second electrical signals corresponding the sensing of the reflected light. The optical code scanner further includes at least one of exposure circuitry for controlling exposure during the sensing of the reflected light, gain circuitry for processing gain of at least a portion of the plurality of second electrical signals, and an illumination assembly for providing illumination for illuminating the target; and a processing circuitry for processing at least a portion of the at least one first electrical signal and controlling at least one of the exposure circuitry, the gain circuitry and the illumination assembly in accordance with the processing of the at least a portion of the at least one first electrical signal.

In an alternate embodiment of the invention, a method is provided for scanning an optical code. The method includes the steps of sensing ambient light conditions and generating at least one first electrical signal corresponding to the sensing of the ambient light conditions; sensing light reflected from the target being imaged and generating a plurality of second electrical signals corresponding the sensing of the reflected light; processing at least a portion of the at least one first electrical signal; and controlling at least one of exposure during the sensing of the reflected light, gain processing of at least a portion of the plurality of second electrical signals and illumination of the target in accordance with the processing.

BRIEF DESCRIPTION OF THE DRAWINGS

These and other features, aspects, and advantages of the present invention will become better understood with reference to the below listed drawings, and detailed description of the invention.

DETAILED DESCRIPTION OF THE PREFERRED EMBODIMENTS

Figure 1:
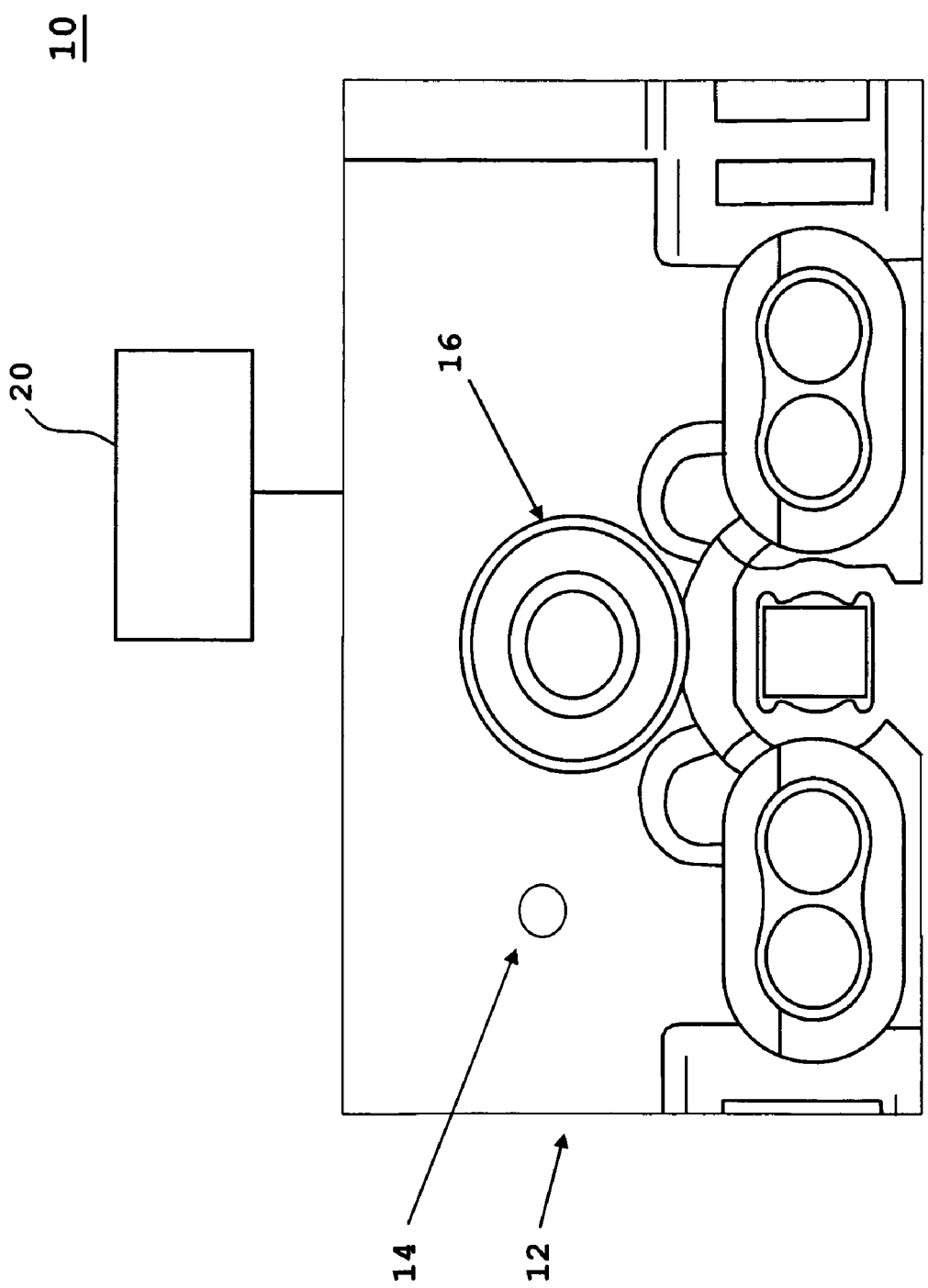
FIG. 1 is a front view of an embodiment of an optical code imaging system in accordance with the present invention.

In FIG. 1 a front view of an exemplary optical code imaging system 10 is shown having a scanner 12 having first and second apertures 14, 16. The first aperture 14 is associated with an ambient light sensor (not shown) described below with respect to FIGS. 2-6. The second aperture 16 is associated with a photo sensor array (not shown), described below with respect to FIGS. 2-3. The scanner 12 may be in wired or wireless communication with at least one device 20, such as host terminal, other scanners, peripheral devices, etc.

Figure 2:
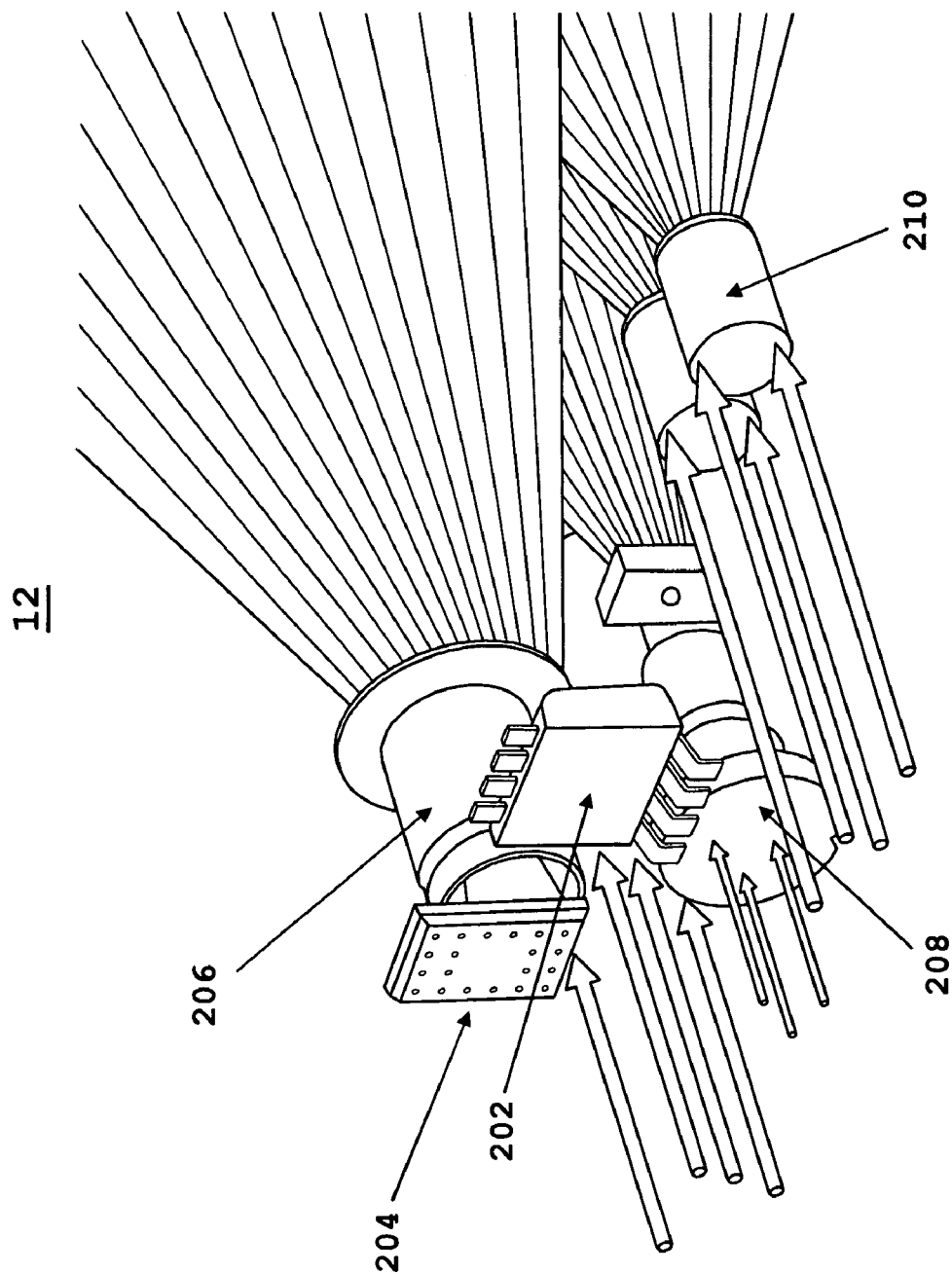
FIG. 2 is an exploded view of an embodiment of a scanner of the optical code imaging system shown in FIG. 1.
Figure 3:
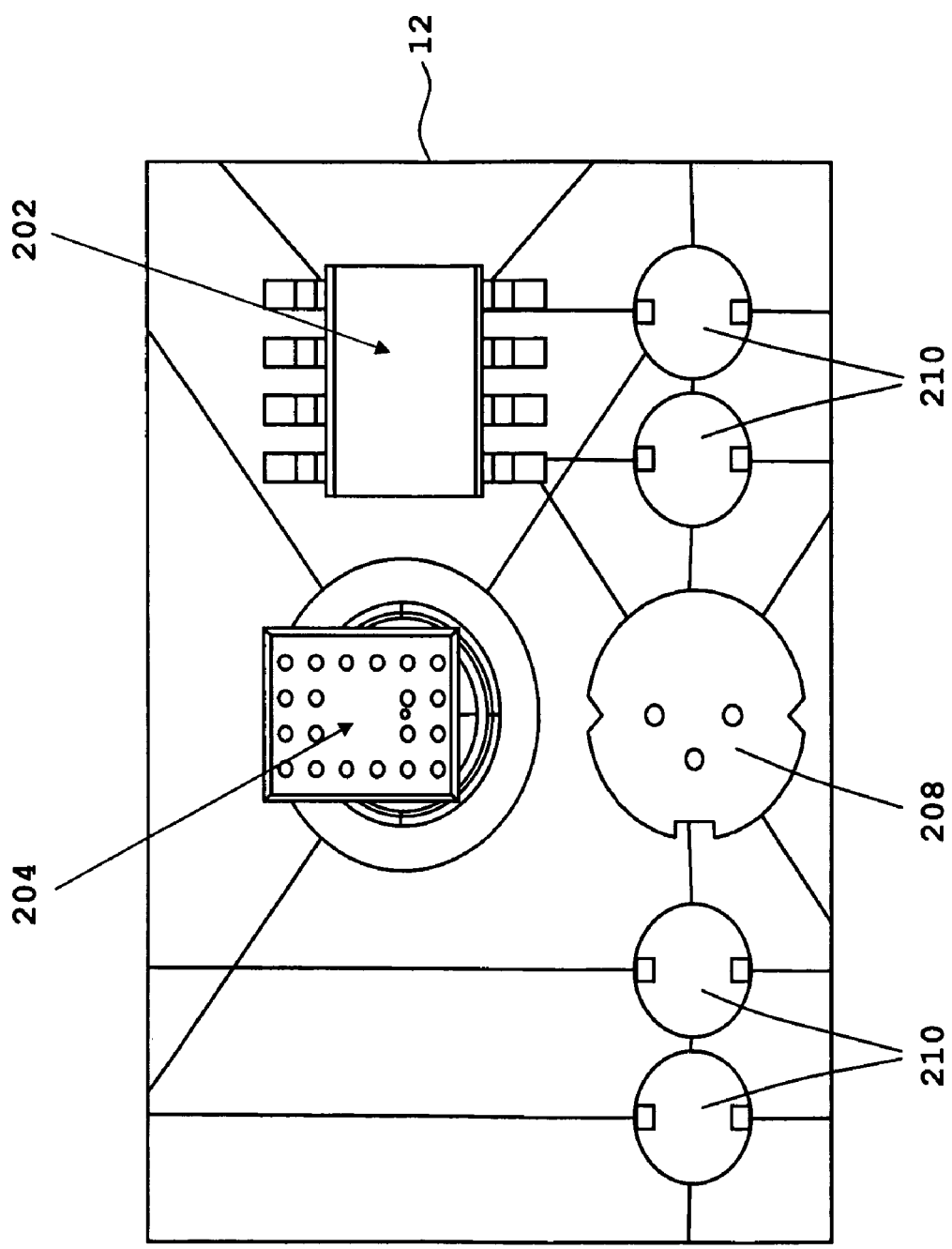
FIG. 3 is a back view of the scanner shown in FIG. 2.

FIGS. 2 and 3 show respective back and exploded views of the scanner 12, where the scanner 12 is shown to further include an ambient light sensor 202, a photo sensor array 204, imaging optics 206, and optionally an aiming assembly 208 for providing assistance in aiming the scanner 12, and an illumination assembly 210 for providing illumination when performing an imaging operation.

The ambient light sensor 202 includes one or more photo sensors for sparsely sampling ambient light conditions. The photo sensors of the ambient light sensor 202 sense light including the reflected light transmitted through the first aperture 14. Optics, including one or more lenses, may optionally be provided for focusing ambient light transmitted through the first aperture 14 onto the ambient light sensor 202. The photo sensors of the ambient light sensor 202 are capable of sensing a range of light intensities and generating the at least one first electrical signal, which corresponds to the sensing and is indicative of the ambient light intensity.

It is preferable for the ambient light sensor 202 to include a minimal number of sensors for minimizing processing, use of processing resources and processing time. Accordingly, it is preferable that the first electrical signal(s) is insufficient for generating a decodable image (i.e., an image that has sufficient information for being decoded by a decoding module for decoding optical codes). The first electrical signal(s) is processed for generating ambient light information in accordance with the sparse sampling, where the processing of the first electrical signal(s) for providing ambient lighting conditions may be performed entirely by analog components. The number of photo sensors in the ambient light sensor corresponds to the number of samples acquired for sampling the ambient lighting conditions.

The photo sensor array 204 includes an array of photo sensors capable of sensing light reflected from objects lying within the field of view (FOV) of the scanner 400, and of generating the plurality of second electrical signals which correspond to the sensing, where the FOV of the photo sensor array 204 defines the FOV of the scanner 200. The photo sensors of the photo sensor array 204 sense light, including the reflected light, transmitted through the second aperture 16. The imaging optics 206 includes one or more lenses for focusing the light transmitted through the second aperture 16 onto the photo sensor array 204. The number of photo sensors in the photo sensor array 204 corresponds to the number of pixels of information which describe the image generated by the scanning operation, which determines the resolution of the image. An ample number of photo sensors are provided for generating enough pixels for generation of a decodable image. The plurality of second electrical signals are digitized for generating the image and for decoding thereof. The photo sensor array 204 may be a CCD or other similar device.

The illumination assembly 210 includes one or more light sources, such as light emitting diodes (LEDs), xenon tubes or laser sources, for providing illumination during sensing by the photo sensor array 204. The light sources, preferably LEDs, are activated during a scan operation (i.e., image capture, including sensing and decode attempt), but preferably are not activated prior thereto, so as not to affect the ambient lighting conditions being sensed by the ambient light sensor 202. The illumination assembly 210 further includes circuitry for determining the intensity of the illumination provided, and duration of the illumination provided, such as in accordance with illumination settings, as described further below. The circuitry for determining the intensity may include, for example, circuitry for selecting light source(s) that are enabled during an illumination operation from the at least one light source, and/or circuitry for determining the amount of current input to the one or more light sources. The circuitry for determining the duration may include, for example, a counter and/or a timer.

The FOV of the ambient light sensor 202 may or may not coincide or overlay the FOV of the photo sensor array 204. Preferably, the relationship between the size of the ambient light sensor 202, the size of the first aperture 14, and the effective focal distance for the ambient light sensor 202 (i.e., distance from the first aperture 14 to the ambient light sensor 202) is selected for optimizing coincidence of the FOV of the photo sensor array 204 and the ambient light sensor 202. The optimization is for avoiding saturation of the ambient light sensor at an extreme high illumination level while providing adequate sensitivity for light sensing at a low level of illumination.

In another embodiment of the invention, the ambient light sensor 202 is included in photo sensor array 204, where the photo sensor array 204 includes one or more photo sensors of the ambient light sensor 202. For example, the ambient light sensor 202 and the photo array sensor 204 may be provided on the same circuit board. Furthermore, at least one of the photo sensors of at least one of the ambient light sensor 202 and/or the photo array sensor 204 may be disabled when photo sensors of the other of the ambient light sensor 202 and the photo array sensor 204 are enabled. The number of photo sensors included in ambient light sensor 202 is significantly less than the number of photo sensors included in the array of photo sensor array 204. The photo sensors of the photo sensor array 204 that are not included in the ambient light sensor 202 are "closed" (i.e., disabled) when a scan operation is not being performed. The sensors may be "closed", such as by physically blocking light from striking the sensors, or by electronically blocking generation of electrical signals by the blocked sensors, transfer of the electrical signals, or processing of the electrical signals, such as digitizing, image processing and/or decoding thereof.

The photo sensors included in the ambient light sensor 202 may be dedicated to sensing ambient light only, and may be "closed" when a scan operation is being performed, or alternatively may be used for ambient light sensing as well as scan operations, or a combination thereof (where a portion of the photo sensors included in the ambient light sensor 202 are dedicated). The photo sensors included in the ambient light sensor 202 may be distributed among the sensors of the photo sensor array 204 or may be positioned as a group, or a combination thereof. Furthermore, only one aperture may be provided for transmitting light to the ambient light sensor 202 and the photo array sensor 204.

Figure 4:
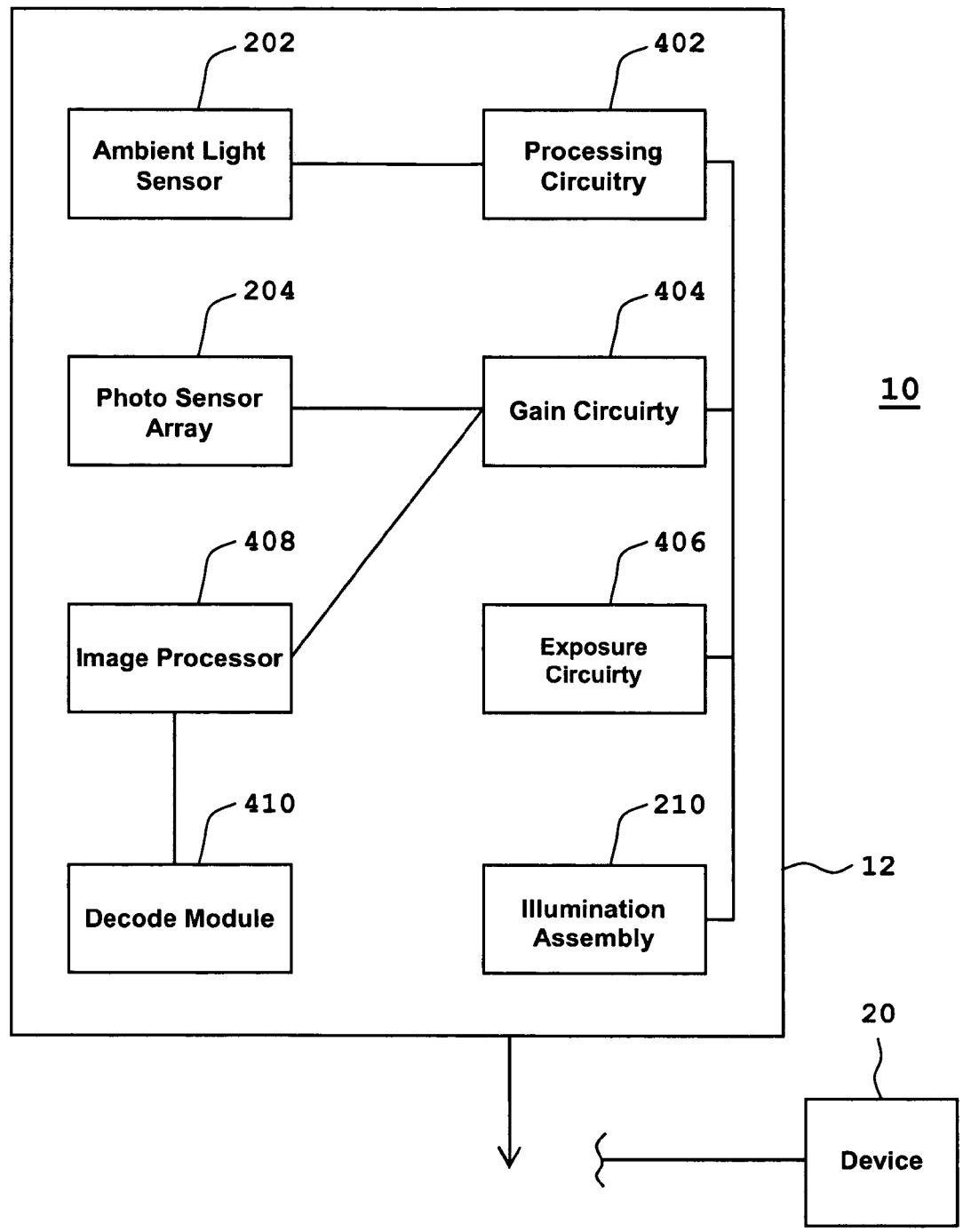
FIG. 4 is a block diagram of the optical code imaging system shown in FIG. 1.

With respect to FIG. 4, a block diagram of the optical code imaging system 10 is shown, including the ambient light sensor 202, the photo sensor array 204, processing circuitry 402, gain circuitry 404, exposure circuitry 406, the illumination assembly 210, image processor 408 and decode module 410. Furthermore, in an embodiment of the invention, the components shown in FIG. 4 are supported within a housing of the scanner 12, such as a handheld scanner. The scanner 12 may be in wired or wireless communication with device(s) 20.

The processing circuitry 402 includes at least one of one or more analog components and at least one digital processor, such as a microprocessor. The digital processor may share some or all of its resources with the image processor 408 and/or the decode module 410. In one embodiment of the invention, the processing circuitry 402 includes one or more analog comparators 412 for comparing a setting voltage of the at least one first electrical signal (individually or in combination) to a reference voltage and outputting a control signal indicative of the results of the compare operation.

The control signal is provided to the gain circuitry 404, the exposure circuitry 406, and/or the illumination assembly 210 for controlling the respective parameter settings, i.e., the gain setting, the exposure setting (i.e., exposure time), and/or illumination setting (i.e., illumination intensity and/or illumination duration). Preferably the control signal is provided directly to the gain circuitry 404, exposure circuitry 406 and/or illumination assembly 210. Alternatively, the control signal may be provided to the digital processor for processing thereof and outputting further control signals to the gain circuitry 404, the exposure/circuitry 406 and/or the illumination assembly 210. Alternatively, the at least one first electrical signal may be digitized and processed by the digital processor for outputting the control signal to the gain circuitry 404, the exposure circuitry 406, and/or the illumination assembly 210. Furthermore, a combination of the aforementioned methods may be used.

It is envisioned that in one embodiment of the invention, the control signal output by the processing circuitry has a frequency that corresponds to the level of light sensed by the ambient light sensor 202. For example, the processing circuitry 402 processes the at least one first electrical signal to determine what level of ambient light has been sensed from at least two possible levels, and generates the control signal so that the frequency of the output control signal is selected to correspond to a frequency that is indicative of (i.e., assigned to correspond to, where a predetermined frequency is assigned to correspond to each possible level) the determined level.

The gain circuitry 404 includes circuitry such as gain amplifiers, as known in the art, for processing gain of signals provided. The gain circuitry 404 may be integrated with the photo sensor array 204 or may be external to the photo sensor array 204. The gain circuitry 404 processes at least a portion of the plurality of second electronic signals generated by the photo sensor array 204 for processing gain thereof in accordance with the gain setting. The plurality of second electronic signals are processed by other circuitry (not shown), such as for buffering, filtering and/or digitizing the plurality of second electronic signals for preparing the received plurality of second electronic signals for image processing by the image processor 408 and/or decoding by the decode module 410. The other circuitry may be provided for processing the plurality of second electronic signals before and/or after the gain circuitry 404 performs gain processing on the plurality of second electronic signals.

The exposure circuitry 406 controls the exposure time (i.e., integration time), and may include an electronic shutter and/or circuitry for controlling a mechanical shutter. The exposure circuitry 406 may be integrated with the photo sensor array 204 or may be external to the photo sensor array 204. The exposure circuitry 406 controls opening of the shutter (electrical or mechanical) for an amount of time in accordance with the exposure setting, such as where the amount of time corresponds to a magnitude (such as voltage) of the received control signal.

The image processor 408 includes at least one processor for at least a portion of the plurality of second electronic signals, such as for generating a corresponding image, locating the optical code in the image and/or extracting data corresponding to the optical code.

The decode module 410 includes at least one processor for decoding the data corresponding to the optical code and generating decoded information. Preferably, decoded information generated by the decode module 410 is provided (e.g., displayed) to the user and/or provided to a host processor for further processing thereof, such as for processing a transaction, updating a database (e.g., inventory), etc. The at least one processor of the decode module 410, the image processor 408 and the digital processor of the processing circuitry 402 may partially or completely share the same resources.

In one embodiment, the first and second apertures 14, 16 and associated lenses are housed in one chassis. In another embodiment, the first and second apertures 14, 16 and the at least one lens are housed in at least a first and second chassis. It is envisioned that the second aperture 16 and associated lens(es) is housed in the second chassis, and wherein the second chassis is removable from the first chassis. It is further envisioned that a scanner 12 having only a photo sensor array 204 may be outfitted with an additional chassis housing the ambient light sensor 202, associated second aperture 16 and optionally associated lens(es). The scanner 12 is provided with connections from the ambient light sensor 202 to the processing circuitry, and from the processing circuitry 402 to at least one of the gain circuitry 404, the exposure circuitry 406 and the illumination assembly 210 for control thereof. The processing circuitry 402 is updated with appropriate software, firmware and/or hardware to incorporate processing of the second ambient light signals and generation of the desired control signals.

In operation, ambient light enters the scanner via the first aperture 14. The ambient light is sensed by the ambient light sensor 202, which generates one or more first electrical signals corresponding to the sensing and which is indicative of ambient lighting conditions (intensity). The first electrical signal is processed by processing circuitry 402, which determines, in accordance with the processing, a desired setting for controlling at least one of the gain circuitry 404, the exposure circuitry 406, and the illumination assembly 210. The first electrical signal corresponds to a sampling of ambient light conditions associated with one or more points in the FOV of the ambient light sensor 202. The processing circuitry 402 controls at least one of the gain circuitry 404, the exposure circuitry 406, and the illumination assembly 210 for setting parameters such as gain of the gain circuitry 404, exposure time (integration time) of the exposure circuitry 406, illumination intensity of illumination generated by the illumination assembly 210 and/or duration of illumination generated by the illumination assembly 210 in accordance with the corresponding desired settings.

Once the parameters of the gain circuitry 404, the exposure circuitry 406, and/or the illumination assembly 210 have been set to the corresponding settings, a scan operation is performed where the illumination assembly 210 is activated for providing illumination in accordance with the illumination intensity and/or illumination duration settings, light reflected from objects within the FOV of the scanner (e.g., a target being imaged) is exposed to the photo sensor array 204 and sensed by the photo sensor array 204, wherein the exposing is performed in accordance with exposure time setting for the exposure circuitry 406. The photo sensor array 204 generates a plurality (an array) of second electrical signals corresponding to the sensing, which further correspond to a two-dimensional array of pixel information for forming an image. At least a portion of the plurality of second electrical signals are processed for preparing them for digital processing, including amplification thereof with the gain circuitry 404 in accordance with the gain setting, and digitization thereof. At least a portion of the digitized signals are then processed by the image processor 408 and/or the decode module 410 for generating an image and decoding the optical code in the image. The image includes sufficient data for processing by the decoder module 410, so that when the optical code is properly imaged the decoder module 410 can successfully decode the image.

Preferably, the ambient light sensor 202 operates continuously, where the first electric signal is processed continually, and the gain circuitry 404, the exposure circuitry 406, and/or the illumination assembly 210 is controlled continuously (in real time) in accordance with the continually processed first electric signal. Accordingly, the gain, exposure time, illumination intensity and/or illumination duration are set in accordance with the ambient light conditions at any given time, so that when a scan operation is commenced the appropriate gain, exposure time, illumination intensity and/or illumination duration settings are used.

Processing time and resources are minimized for processing of the first electrical signal generated by the ambient light sensor 202 for adjusting the appropriate gain, exposure, and/or illumination settings. Preferably, the processing time for the above is under 1 msec. On the contrary, it takes on the order of tens of milliseconds (typically 33 milliseconds) to process the plurality of second electrical signals generated by the photo array sensor 204.

It is contemplated that while the ambient light sensor 202 operates continuously and the first electric signal is processed continually, the gain circuitry 404, the exposure circuitry 406, and/or the illumination assembly 210 are set in accordance with the first electric signal upon commencing a scan operation, such as upon activation of a trigger by a user. Accordingly, the gain circuitry 404, the exposure circuitry 406, and/or the illumination assembly 210 are adjusted only upon activation of a scan operation with settings that were already determined during the continual processing of the plurality of second electrical signals.

Accordingly, by using the ambient light sensor 202 and processing the first electrical signals for determining the ambient light conditions for setting the gain, exposure and/or illumination settings, a significant amount of processing resources and time are saved, as opposed to the amount of processing resources and time that is commonly used for determining the ambient light conditions from the plurality of second signals generated by the photo array sensor 204.

Figure 5A:
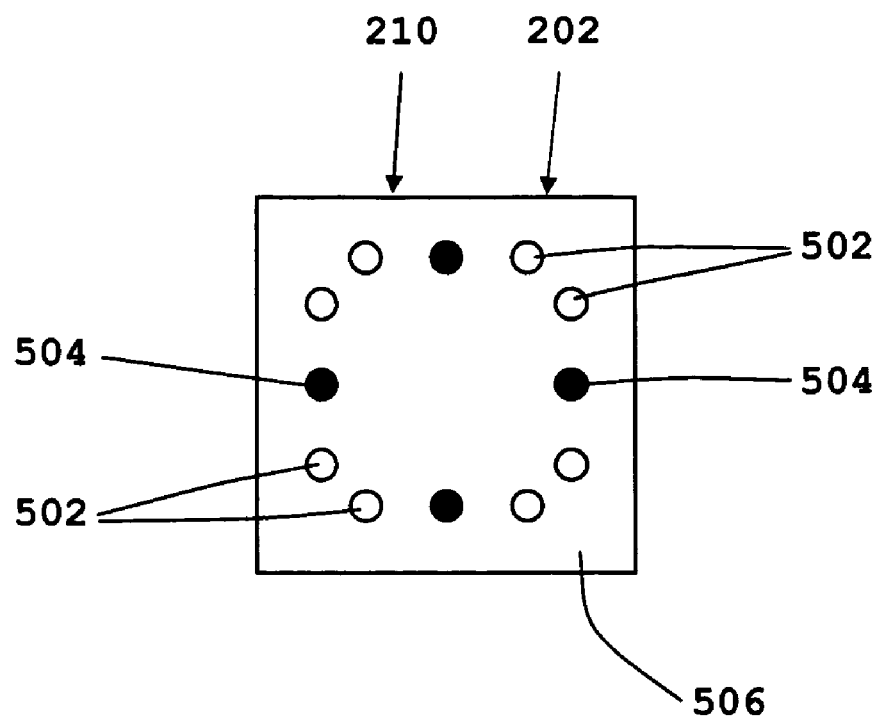
FIG. 5A is a front view of an illumination assembly of the scanner shown in FIG. 2.
Figure 5B:
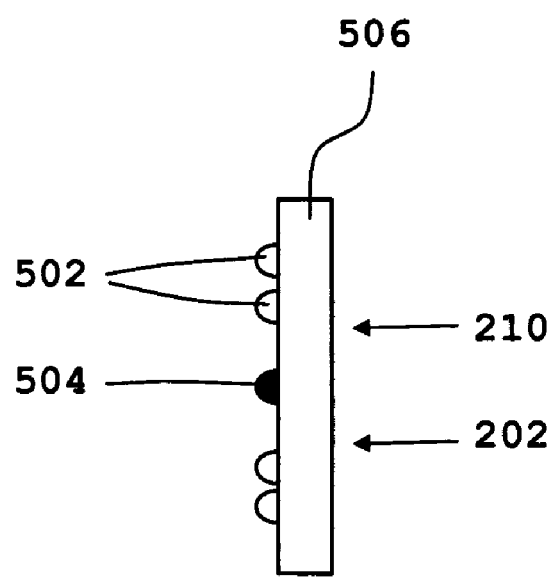
FIG. 5B is a side view of the illumination assembly shown in FIG. 5A.

With respect to FIGS. 5A and 5B, the ambient light sensor 202 is positioned in the same plane as light sources (e.g., LEDs) 502 of the illumination assembly 210, so that the ambient light sensor 202 has substantially the same view of the object being imaged as the illumination assembly and for obtaining a precise measurement to the ambient light incident on the object. Photo sensors 504 of the ambient light sensor 202 are shown mounted on a support 506 for the LEDs 502 of the illumination assembly, so that the photo sensors 504 are positioned in the same plane as the LEDs 502.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical code scanner system for imaging a target comprising:
    an ambient light sensor having at least one photo sensor for sensing ambient light conditions and generating at least one first electrical signal corresponding to the sensing of the ambient light conditions;
    a photo sensor array having a plurality of photo sensors for sensing light reflected from the target being imaged and generating a plurality of second electrical signals corresponding the sensing of the reflected light;
    at least one of exposure circuitry for controlling exposure during the sensing of the reflected light, gain circuitry for processing gain of at least a portion of the plurality of second electrical signals, and an illumination assembly for providing illumination for illuminating the target; and
    a processing circuitry for processing at least a portion of the at least one first electrical signal and controlling at least one of the exposure circuitry, the gain circuitry and the illumination assembly in accordance with the processing of the at least a portion of the at least one first electrical signal.

2. The optical code scanner system of claim 1, wherein the at least one photo sensor of the ambient light sensor sparsely samples the ambient light conditions.

3. The optical code scanner system of claim 1, wherein the plurality of second electrical signals are processed for generating a decodable image.

4. The optical code scanner system of claim 1, wherein the ambient light sensor operates continuously and wherein the first electrical signal is processed continuously.

5. The optical code scanner system of claim 4, wherein the at least one of the exposure circuitry, the gain circuitry and the illumination assembly is controlled continuously in accordance with the continuously processed first electric signal.

6. The optical code scanner system of claim 1, wherein the processing circuitry comprises only analog devices.

7. The optical code scanner system of claim 1, wherein the processing circuitry determines an ambient light level that corresponds to the processed at least a portion of the at least one first electrical signal electrical signal, and generates a control signal having a selected frequency selected to correspond to the determined ambient light level, and wherein the control signal is output to at least one of the exposure circuitry, the gain circuitry and the illumination assembly for providing control thereof.

8. The optical code scanner system of claim 1, wherein the processing circuitry includes an analog comparator for comparing a voltage of the at least one first electrical signal to a reference voltage and outputting a corresponding control signal for controlling the at least one of the exposure circuitry, the gain circuitry and the illumination assembly.

9. The optical code scanner system of claim 1, wherein the illumination assembly includes at least one light source, and wherein at least a portion of the at least one photo sensor of the ambient light sensor is positioned in the same plane as the at least one light source of the illumination assembly.

10. The optical code scanner system of claim 1, further comprising a decode module including at least one processor for decoding the plurality of second electronic signals.

11. The optical code scanner system of claim 1, wherein the processing circuitry controls the gain circuitry for setting the gain thereof.

12. The optical code scanner system of claim 1, wherein the processing circuitry controls the exposure circuitry for controlling exposure time.

13. The optical scanner system of claim 1, wherein the processing circuitry controls the illumination assembly for controlling at least one of intensity and duration of the illumination provided by the illumination assembly.

14. The optical code scanner system of claim 1, wherein the optical code scanner system is provided with a first aperture through which light passes for striking the ambient light sensor, and a second aperture through which light passes for striking the photo sensor array.

15. The optical code scanner system of claim 14, further comprising at least one lens for focusing light entering at least one of the first and second apertures onto the ambient light sensor and photo sensor array, respectively, and wherein the first and second apertures and the at least one lens are housed in one chassis.

16. The optical code scanner system of claim 14, further comprising at least one lens for focusing light entering at least one of the first and second apertures onto the ambient light sensor and photo sensor array, respectively, and wherein the first and second apertures and the at least one lens are housed in at least a first and second chassis.

17. The optical scanner system of claim 16, wherein the second aperture is housed in the second chassis, and wherein the second chassis is removable from the first chassis.

18. The optical code scanner system of claim 1, wherein the optical code scanner system is provided with one aperture through which ambient light passes for striking the ambient light sensor and reflected passes for striking the photo sensor array.

19. The optical code scanner system of claim 1, wherein the ambient light sensor and the photo array sensor are provided on the same circuit board.

20. The optical code scanner system of claim 1, wherein at least one of the ambient light sensor and the photo array sensor are disabled when photo sensors of the other of the ambient light sensor and the photo array sensor are enabled.

21. The optical code scanner system of claim 20, wherein disabling a photo sensor of the at least one of the photo sensors includes at least one of physically blocking light from striking the photo sensor, electronically blocking generation of electrical signals by the disabled photo sensor, disabling transfer of electrical signals generated by the disabled photo sensor, and disabling processing of electrical signals generated by the disabled photo sensor, wherein the processing includes at least one of digitizing, image processing and decoding.

22. The optical code scanner system of claim 1, wherein the gain circuitry, the exposure circuitry and the illumination assembly are controlled before the plurality of second electrical signals are generated.

23. A method of scanning an optical code comprising the steps of:
sensing ambient light conditions by passing light through a first aperture and generating at least one first electrical signal corresponding to the sensing of the ambient light conditions;
passing light reflected from the target being imaged through a second aperture;
sensing light reflected from the target being imaged and passed through the second aperture, and generating a plurality of second electrical signals corresponding the sensing of the reflected light;
processing at least a portion of the at least one first electrical signal; and
controlling at least one of exposure during the sensing of the reflected light, gain processing of at least a portion of the plurality of second electrical signals, and illumination of the target in accordance with the processing.

24. The method according to claim 23, further comprising the steps of:
generating an image corresponding to the plurality of second electric signals; and decoding the image.

25. The method according to claim 23, wherein the sensing ambient light includes sampling the ambient light, and wherein a decodable image can not be generated from the at least one first electrical signal.

26. The method according to claim 23:
wherein sensing ambient light step is continuous; and
wherein the processing the at least a portion of the first electrical signal step is continuous.

27. The method according to claim 26, wherein the controlling the at least one of the exposure during the sensing of the reflected light, the gain processing and the illumination of the target is continuous in accordance with the continuously processed first electric signal.

28. The method according to claim 23, further comprising the step of decoding the plurality of second electronic signals.

29. The method according to claim 23, wherein the controlling the gain processing step includes controlling a gain setting.

30. The method according to claim 23, wherein the controlling the exposure step includes controlling an exposure time.

31. The method according to claim 23, wherein the controlling the illumination of the target step includes controlling at least one of intensity and duration of the illumination.

32. The method according to claim 23, further comprising the step of passing light through one aperture for sensing the ambient light and the light reflected from the target being imaged.

33. The method according to claim 23, further comprising the step of disabling at least one of the sensing of the ambient light and the sensing of the light reflected from the target being imaged when the other of the sensing of the ambient light sensor and the sensing of the light reflected from the target being imaged is enabled.

34. The method according to claim 33, wherein the disabling includes at least one of physically blocking light from being sensed by a photo sensor, electronically blocking generation of electrical signals by a photo sensor, disabling transfer of electrical signals generated by a photo sensor, and disabling processing of electrical signals generated by the disabled photo sensor, wherein the processing includes at least one of digitizing, image processing and decoding.

35. The method according to claim 23, wherein the step of controlling at least one of the exposure, the gain processing and the illumination of the target is performed before the step of sensing light reflected from the target being imaged.

* * * * *

UNITED STATES PATENT AND TRADEMARK OFFICE
CERTIFICATE OF CORRECTION

PATENT NO.         : 7,303,126 B2                                          Page 1 of 1
APPLICATION NO.   : 10/803669
DATED              : December 4, 2007
INVENTOR(S)        : Patel et al.

It is certified that error appears in the above-identified patent and that said Letters Patent is hereby corrected as shown below:

In Fig. 4, Sheet 4 of 5, for Tag "404", Line 1, delete "Circuirty" and insert -- Circuitry --, therefor.

In Fig. 4, Sheet 4 of 5, for Tag "406", Line 2, delete "Circuirty" and insert -- Circuitry --, therefor.

In Column 8, Line 53, in Claim 7, after "first" delete "electrical signal".

In Column 9, Line 12, in Claim 13, after "optical" insert -- code --.

In Column 9, Line 33, in Claim 17, after "optical" insert -- code --.

Signed and Sealed this

Ninth Day of June, 2009

JOHN DOLL
*Acting Director of the United States Patent and Trademark Office*